(12) United States Patent
Collins

(10) Patent No.: US 6,789,053 B2
(45) Date of Patent: Sep. 7, 2004

(54) TRIM BALANCING OF SECOND-ORDER NON-LINEARITY IN DOUBLE ENDED TUNING FORK RESONATORS

(75) Inventor: Paul Collins, Issaquah, WA (US)

(73) Assignee: Honeywell International, Inc., Morristown, NJ (US)

( * ) Notice: Subject to any disclaimer, the term of this patent is extended or adjusted under 35 U.S.C. 154(b) by 209 days.

(21) Appl. No.: 10/214,924

(22) Filed: Aug. 7, 2002

(65) Prior Publication Data

US 2003/0010122 A1 Jan. 16, 2003

Related U.S. Application Data

(60) Division of application No. 09/730,140, filed on Dec. 4, 2000, now Pat. No. 6,484,579, which is a continuation-in-part of application No. 08/873,048, filed on Jun. 11, 1997, now Pat. No. 6,282,959.
(60) Provisional application No. 60/180,009, filed on Feb. 3, 2000, and provisional application No. 60/019,566, filed on Jun. 11, 1996.

(51) Int. Cl.[7] .............................................. G06F 17/10
(52) U.S. Cl. .................................................... 703/2
(58) Field of Search .......................... 703/2; 73/504.03, 73/504.12, 504.16, 510, 514.29, 514.33, 514.34, 514.38, 514.36; 310/321

(56) References Cited

U.S. PATENT DOCUMENTS

| | | | | |
|---|---|---|---|---|
| 3,702,073 A | * | 11/1972 | Jacobs | 73/514.32 |
| 4,250,757 A | * | 2/1981 | Hanson | 73/514.23 |
| 4,372,173 A | * | 2/1983 | EerNisse et al. | 73/862.59 |
| 4,446,394 A | * | 5/1984 | Albert | 310/321 |
| 4,597,003 A | * | 6/1986 | Aine et al. | 428/450 |
| 4,658,175 A | * | 4/1987 | Albert | 310/323.21 |
| 4,724,351 A | | 2/1988 | EerNisse et al. | 310/328 |
| 4,766,768 A | * | 8/1988 | Norling et al. | 73/497 |
| 5,113,698 A | | 5/1992 | Grlj et al. | 73/862.59 |
| 5,594,170 A | * | 1/1997 | Peters | 73/514.29 |
| 5,948,981 A | * | 9/1999 | Woodruff | 73/514.29 |
| 5,996,411 A | * | 12/1999 | Leonardson et al. | 73/514.29 |
| 6,282,959 B1 | * | 9/2001 | Blake et al. | 73/504.16 |
| 6,484,579 B2 | * | 11/2002 | Collins | 73/514.29 |

FOREIGN PATENT DOCUMENTS

WO WO 97/47977 12/1997 ........... G01P/15/10

OTHER PUBLICATIONS

Barthod et al., C. New Force Sensor Based on a Double Ended Tuning Fork, Proceedings of the 2000 IEEE/EIA International Frequency Control Symposium and Exhibition, Jun. 2000, pp. 74–78.*

Leonardson et al., R. SiMMA Accelerometer for Inertial Guidance and Navigation, Position Location and Navigation Symposium, IEEE, Apr. 1998, pp. 152–160.*

"Finite–Element Analysis of Quartz Digital Accelerometer," E.D. Reedy, Jr. and W.J. Kass, 8104 IEEE Transactions on Ultrasonics, Ferroeletrics, and Frequency Control, 37(1990) Sep., No. 5, New York US.

* cited by examiner

*Primary Examiner*—Russell Frejd
(74) *Attorney, Agent, or Firm*—Charles J. Rupnick

(57) ABSTRACT

A method for designing double-ended tuning fork (DETF) sensors such that the second-order non-linearity of a first DETF and of a second DETF substantially cancel.

10 Claims, 9 Drawing Sheets

Fig. 1 *(PRIOR ART)*

TRIM BALANCING OF SECOND-ORDER NON-LINEARITY IN DOUBLE ENDED TUNING FORK RESONATORS

This application is a Division of U.S. patent application Ser. No. 09/730,140 filed in the name of Paul Collins on Dec. 4, 2000, now U.S. Pat. No. 6,484,579, which in turn is a Continuation-in-Part of U.S. application Ser. No. 08/873,048 filed in the names of Blake, et al on Jun. 11, 1997, now U.S. Pat. No. 6,282,959, which claims the benefit of U.S. Provisional application Ser. No. 60/019,566 filed on Jun. 11, 1996, each assigned to the assignee of the present application, and further claims the benefit of U.S. Provisional application Ser. No. 60/180,009, filed in the name of Paul Collins on Feb. 3, 2000, the complete disclosures of each of which are incorporated herein by reference.

BACKGROUND OF THE INVENTION

The invention relates to double-ended tuning forks and particularly to double-ended tuning forks as used in the construction of accelerometer devices and the cancellation of second order non-linearity thereof.

Non-linearity in accelerometer outputs can lead to significant measurement errors in the absence of compensation circuitry. Generally, non-linearity errors occur when inputs are near the full-scale range of the instrument or there is vibration along the input axis, but non-linearity errors may also appear simply because the particular application requires an extremely linear response. Instruments using double-ended tuning forks, or DETFs, as inertial reaction force sensors are particularly vulnerable to errors introduced by non-linearity. The inherent non-linearity of a force sensor or accelerometer using a single DETF is typically higher than that of a common high-accuracy, analog, force-rebalance accelerometer, as described in U.S. Pat. Nos. 3,702,073 and 4,250,757, for example.

A DETF-based accelerometer, however, possesses real advantages over other accelerometers. For example, a DETF-based accelerometer typically provides smaller size, lower power consumption, and greater ease of interface to digital systems. Compensation of DETF-based accelerometer non-linearity provides all these benefits without a serious performance penalty.

Practical accelerometers in the past have used software compensation of non-linearity, or a combination of software and hardware compensation. Software compensation is not viable for other than constant or slowly varying acceleration inputs because the processor cannot execute the compensation commands at frequencies high enough to keep pace with the accelerometer inputs.

One combined software and hardware compensation approach that has been used is to infer the input acceleration based on models that depend on the difference frequency between two DETFs. This approach assumes that the DETFs have been designed to possess the same second-order non-linearity when subjected to purely axial forces.

The DETFs may be attached either to one or to two independent proof masses. Dual-proof mass accelerometers are really two separate accelerometers in the same package. Using dual-proof mass accelerometers leads to difficult matching problems to ensure that the responses of the two accelerometers track when the accelerometer experiences vibration or other rapidly-changing inputs.

A common approach to avoiding the common mode tracking problems created by using two accelerometers in one package is to attach two DETFs to a single proof mass, arranging them so that displacement of the proof mass under loading simultaneously places one of them in tension and the other in compression. In practical accelerometers, the exact arrangement of the DETFs is dictated by several factors. One factor is the need to incorporate stress isolation, for example, see U.S. Pat. No. 4,766,768, the complete disclosure of which is incorporated herein by reference. Another factor is the necessity of having both DETFs on the same side of the proof mass in monolithic silicon accelerometers built with epitaxial layer DETFs. Other reasons which do not consider the effect of the DETF positions on the non-linearity of the accelerometer such as manufacturing tolerances or other processing limitations, or size restrictions also dictate the exact arrangement of the DETFs.

General information on the design of vibrating beam accelerometers may be found in the text by Lawrence entitled Modem Inertial Technology: Navigation, Guidance and Control, Copyright 1993, Springer-Verlag, New York.

FIG. 1 shows a plan view of a DETF accelerometer which combines a proof mass 2 and DETFs 4, 6. DETFs 4, 6, however, are positioned at much different distances 14, 16 from the centerline 8 of the hinges 10, 12 suspending proof mass 2. Thus, the respective non-linearity of the two DETFs do not cancel effectively when the difference frequency is formed, even when the DETFs are designed for the ideal case in which second-order non-linearity, K2, values cancel when subjected to purely axial forces. The lack of second-order non-linearity cancellation when the difference frequency is formed causes measurement errors and creates difficulties when DETF force sensors and accelerometers are used in applications requiring a high degree of linearity.

Above incorporated co-pending parent U.S. patent application Ser. No. 08/873,048 describes a method for determining relative positioning of the DETFs in a dual vibrating beam accelerometer which substantially overcome the problems of the prior art by providing positioning of the two DETFs which minimizes or substantially eliminates second-order, K2, non-linearity effects. The parent application also provides various physical embodiments which place the two DETFs such that the individual DETF second-order values are a minimum and the composite second-order values are a minimum and the composite second-order terms cancel or substantially cancel.

However, as ever greater degrees of linearity are required by more and more sensitive accelerometer applications, additional fine tuning of second-order, K2, non-linearity effects is required to ensure complete or substantially complete cancellation of the composite second-order terms of two DETFs in a practical dual vibrating beam accelerometer.

SUMMARY OF THE INVENTION

The present invention overcomes the limitations of the prior art by recognizing and accounting for the deformation of the DETFs in a two-DETF, single-proof-mass accelerometer that are not purely axial extensions or compressions, but also involve rotations and transverse displacements of the ends of the DETFs. The rotations and displacements create additional changes in the tine stiffness, beyond those that occur due to simple stress stiffening effects. The additional stiffness changes alter the linearity of the DETFs so that the second-order effects such as those due to, for example, Euler buckling loads, do not cancel when the difference frequency is formed.

According to one aspect of the present invention, the present invention includes various embodiments which overcome the limitations of the prior art by providing mass balances positioned on each of the two DETFs which minimize or eliminate second-order, K2, non-linearity effects.

According to another aspect of the present invention, the invention provides a double-ended tuning fork (DETF) sensor having first and second DETFs, a proof mass, a support frame, and a hinge rotatably suspending the proof mass from the support frame. The two DETFs are spaced apart and connected between the proof mass and the support frame. The first and second DETFs are each constructed having two tines. According to the invention, mass balances are formed projecting from each of the tines of the first DETF and are sized and positioned to form a first second-order non-linearity term associated with the first DETF. Similarly, mass balances projecting from each of the tines of the second DETF are sized and positioned to form a second second-order non-linearity term associated with the second DETF such that the second second-order non-linearity term is substantially equal in sign and magnitude to the first second-order non-linearity term.

According to one aspect of the invention, the proof mass and support frame are formed in a silicon wafer having an active epitaxial layer formed on one surface thereof, and each of the DETFs and the mass balances are formed in the active epitaxial layer.

According to another aspect of the invention, the mass balances project outwardly from the edges of the tines in a formation substantially symmetrical about a longitudinal axis of the respective DETF. In particular, the mass balances are formed along an edge of each tine as a function of the second-order non-linearity term associated with the respective DETF, such that the mass balances adjusts the second second-order non-linearity term associated with each DETF to a value substantially equal in magnitude to the second-order non-linearity term associated with the other DETF.

According to still another aspect of the invention, the multiple mass balances project from each of the tines.

According to another aspect of the present invention, the invention provides methods for sizing and positioning the mass balances on one or both of the dual-DETFs such that second-order non-linearity of the two DETFs are equal or substantially equal under the deformations that they actually undergo in use. Thus, the present invention provides cancellation of the composite second-order non-linearity.

DETAILED DESCRIPTION OF THE PREFERRED EMBODIMENTS

Figure 1:
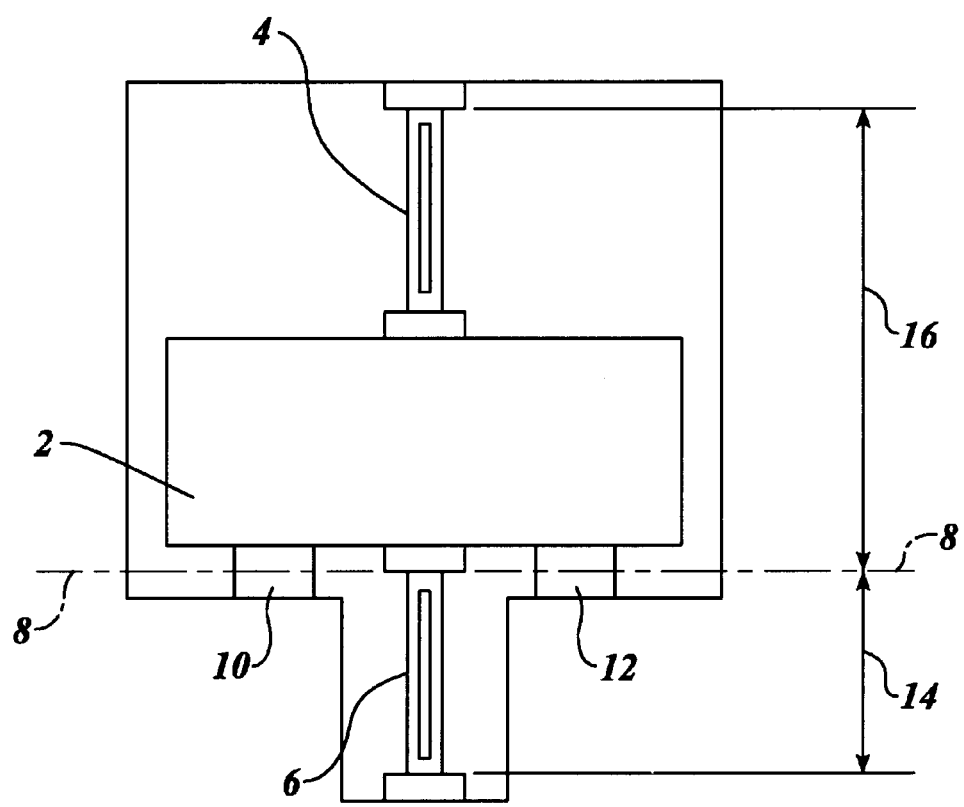
FIG. 1 is a plan view of a double-ended tuning fork device according to the prior art.

The mounting positions of the two DETFs on the proof mass and on the outer support structure directly affect second order non-linearity performance and have resulted in design compromises in the prior art. The invention of the parent application provides various embodiments which overcome the problems of the prior art by providing positioning of the two DETFs which minimizes or eliminates second-order, K2, non-linearity effects. The parent invention is effective in of 100 g's and in high vibration environments as well as in lower force and vibration ranges. Furthermore, the parent invention is realized in geometry features; thus, no external environment nulls-out or degrades sensor performance. In other words, there is no theoretical limit on the range of g-force input or vibration environment in which the invention may operate.

However, as DETF force sensors and accelerometers are used in applications requiring ever higher degrees of linearity, further fine tuning of second-order non-linearity terms is necessary to eliminate measurement errors and ensure cancellation of second-order non-linearity effects when the difference frequency is formed. The present invention therefore provides trim balancing tabs, one or more of which are added to each DETF to equalize the second-order, K2, non-linearity effects and ensure cancellation. Any practical limits on the operational g-force range or vibrational environment result from limitations in manufacturing processes used to practice the invention. The present invention provides the overall product goals of excellent performance and low unit cost.

Various embodiments of the present invention are disclosed. The preferred geometry to be used is dictated by the specific design constraints of a particular application. The present invention provides a method for determining the preferred DETF trim tab configuration and determining the fine adjustment and matching of the K2 linearity of the two DETFs to achieve the desired composite sensor performance while realizing low unit cost.

There are many ways of expressing the non-linearity of the DETFs which are known to those of skill in the art. The general equations describing DETF performance follow and the terms and coefficients used herein are defined. Although the calculation of non-linearity can be carried out to an infinite degree or order, typical practical accelerometer applications carry out the calculations only to the third order because of the diminishing effect of higher order non-linearity on DETF performance. All of the many ways of expressing the third-order non-linearity start with a formula associating DETF frequencies, F, with input acceleration, g. The output frequencies of the two DETFs, F1 and F2, are given as:

$$F1 = \sum_{n=0}^{3} a_n * g^n \text{ and } F2 = \sum_{n=0}^{3} b_n * g^n \quad \text{(Eqs. 1 and 2)}$$

where:

an and bn are constants; and gn=actual input acceleration raised to the nth power.

Thus, the output frequencies of the two DETFs, F1 and F2, at the input acceleration, g, for n=0, 1, 2, and 3 are given as:

$$F1 = a0 + (a1*g) + (a2*g^2) + (a3*g^3) \quad \text{(Eq. 3)}$$

$$F2 = b0 + [b1*(-g)] + [b2*(-g^2)] + [b3*(-g^3)] \quad \text{(Eq. 4)}$$

where:

F1 is the output frequency of the first DETF;

F2 is the output frequency of the second DETF;

g is the actual g-force input sensed by the accelerometer; and a0 . . . a3 and b0 . . . b3 are constants:

a0, b0 are bias;

a1, b1 are scale factor;

a2, b2 are second-order non-linearity; and a3, b3 are third-order non-linearity.

Since the two DETFs in such an accelerometer flex in opposite directions for any given input to the sensor, the sign of the input acceleration, g, of equation (4) is opposite that of equation (3).

Cancellation is given by:

$$F1-F2 \quad \text{(Eq. 5)}$$

which expands to:

$$F1 - F2 = \frac{\begin{array}{l} a0 + (a1*g) + (a2*g^2) + (a3*g^3) - \\ \{b0 + [b1*(-g)] - [b2*(-g^2)] + [b3*(-g^3)]\}1 \end{array}}{\begin{array}{l} [a0 - b0] + [(a1+b1)*g] + \\ [(a2-b2)*g^2] + [(a3+b3)*g^3] \end{array}} \quad \text{(Eq. 6)}$$

The general form of all the expansions for the indicated g-level, G, is:

$$G = K0 + K1*g + K2*g^2 + K3*g^3 \quad \text{(Eq. 7)}$$

where:

G is the indicated acceleration or g-level;

K0 is bias;

K1 is scale factor;

K2 is second-order non-linearity;

K3 is third-order non-linearity; and g is the actual acceleration or g input level in g's.

Conversion from the individual output frequencies of the two DETFs, F1 and F2, to the indicated g-levels, G1 and G2, is achieved by dividing equations (3) and (4), above, by a1 and b1, respectively, such that the scale factor coefficients become equal to 1. Thus, DETF frequency, F1, is converted to indicated g-level, G1, in the form of equation (3) according to:

$$G1 = \frac{F1}{a_1} = \frac{a_0}{a_1} = \frac{a_{1*g}}{a_1} + \frac{a_{2*g}^2}{a_1} + \frac{a_{3*g}^3}{a_1} \quad \text{(Eq. 8)}$$

which can be rewritten in the form of equation (7) as:

$$G1 = K0_1 + 1*g + K2_1*g^2 + K3_1*g^3 \quad \text{(Eq. 9)}$$

where: $K0_1$ . . . $K3_1$ are constants associated with the first DETF and are defined as shown in Table 1.

Similarly, DETF frequency, F2 in the form of equation (7), is converted to indicated g-level, G2, by dividing equation (4) by the constant, b1, to obtain:

$$G_1 = K0_1 + 1*g + K2_1*g^2 + K3_1*g^3 \quad \text{(Eq. 10)}$$

where:

$K0_1$ . . . $K3_1$ are constants associated with the second DETF and are similarly defined as shown in Table 1.

Conversion from the difference frequencies of the two DETFs, F1−F2, to the indicated g-level, G, is achieved by dividing equation (6), above, by the composite scale factor coefficient,(a1+b1). Thus, the difference frequency, F1−F2, is converted to indicated g-level, G, in the form of equation (7). Thus, DETF difference frequency, F1−F2, is converted to indicated g-level, F1−F2 is converted to indicated g-level, GDETF, in the form of equation (6) according to:

$$GDETF = \frac{F1 - F2}{(a1+b1)} = \frac{[a0-b0]}{(a1+b1)} + \frac{[(a1+b1)*g]}{(a1+b1)} + \frac{[(a2-b2)*g^2]}{(a1+b1)} + \frac{[(a3+b3)*g^3]}{(a1+b1)} \quad \text{(Eq. 11)}$$

which can be rewritten in the form of equation (7) as:

$$G = K0 + 1*g + K2*g^2 + K3*g^3 \quad \text{(Eq. 12)}$$

where:

K0 . . . K3 are constants and are defined as shown in equation (11) and Table 1.

Those of skill in the art will recognize that the actual input level, g, may be estimated from either F1, F2 or F1−F2, so long as the appropriate K values are used to form the correct expression for the associated indicated output, G1, G2, or GDETF. Table 1 shows the appropriate K values to be used to form the desired expression for the indicated output, G1, G2, or GDETF, used to estimated the actual input acceleration, g. However, in most DETF applications, measurement of the input acceleration, g, is based upon the difference frequency, F1−F2, and estimated in terms of GDETF using equations (11) and (12).

TABLE 1

| Parameter, Units | G1 Eq. 8 | G2 Eq. 10 | GDETF Eq. 11 |
|---|---|---|---|
| Bias, K0, g | a0/a1 | b0/b1 | $\frac{(a_0 - b_0)}{(a_1 + b_1)}$ |
| Scale Factor, K1, g/g | 1 | 1 | 1 |
| Second-order non-linearity, K2, g/g$^2$ | a2/a1 | b2/b1 | $\frac{(a_2 - b_2)}{(a_1 + b_1)}$ |

TABLE 1-continued

| Parameter, Units | G1 Eq. 8 | G2 Eq. 10 | GDETF Eq. 11 |
|---|---|---|---|
| Third-order non-linearity, K3, g/g$^3$ | a3/a1 | b3/b1 | $\dfrac{(a_3 - b_3)}{(a_1 + b_1)}$ |

Ideally, both DETFs are designed such that a2=b2 and thus the composite second-order non-linearity term, $$\frac{(a_2 - b_2)}{(a_1 - b_1)},$$

is zero in ideal conditions when only axial loading exists. In other words, the second-order non-linearity terms of the individual DETFs are subjected to purely axial forces.

The coefficients in a practical sensor, however, will not exactly match due to design considerations and manufacturing tolerances. Furthermore, in a practical accelerometer, because one end of each of the DETFs is fixed to a solid support structure while the other moves with the proof mass, the two DETFs experience deformations, including rotations and transverse displacements, not accounted for when the DETFs have been designed to have equal second-order non-linearity values when subjected to purely axial forces. Thus, the second and third order non-linearity values, K2 and K3, respectively, will not cancel in a practical accelerometer even when the DETFs are designed to be identical.

Various embodiments of the parent invention hereto overcome this lack of composite second-order cancellation by positioning each of the two DETFs in a practical accelerometer which provides substantially complete cancellation or elimination of second-order, K2, non-linearity effects. Other aspects physical embodiments which place the two DETFs such that the individual DETF second order values of the two DETFs are a substantially equalized and the composite second-order terms cancel.

The invention of the parent application provides positioning the ends of the DETFs attached to the proof mass, which are the ends that move, such that second-order non-linearity of the two DETFs will be equal or substantially equal, under the deformations that they actually undergo in use, including rotation and transverse displacement. For example, the K2 second-order non-linearity of the two DETFs will be within about 0 to 10 micro-g's of one another. Thus, the second-order non-linearity will be absent or substantially absent from the difference frequency. The accelerometer of the parent application places the ends of the DETFs such that the second-order terms, a2 and b2, cancel or substantially cancel when both axial and transverse forces are considered.

With reference to the general expressions of non-linearity above, the composite second-order term in the difference frequency cancels when the difference in the individual DETF coefficient terms, a2-b2, equals zero. Thus, the accelerometer of the parent application places the ends of the DETFs such that a2-b2 is equal to zero, or substantially equal to zero.

Figure 2:
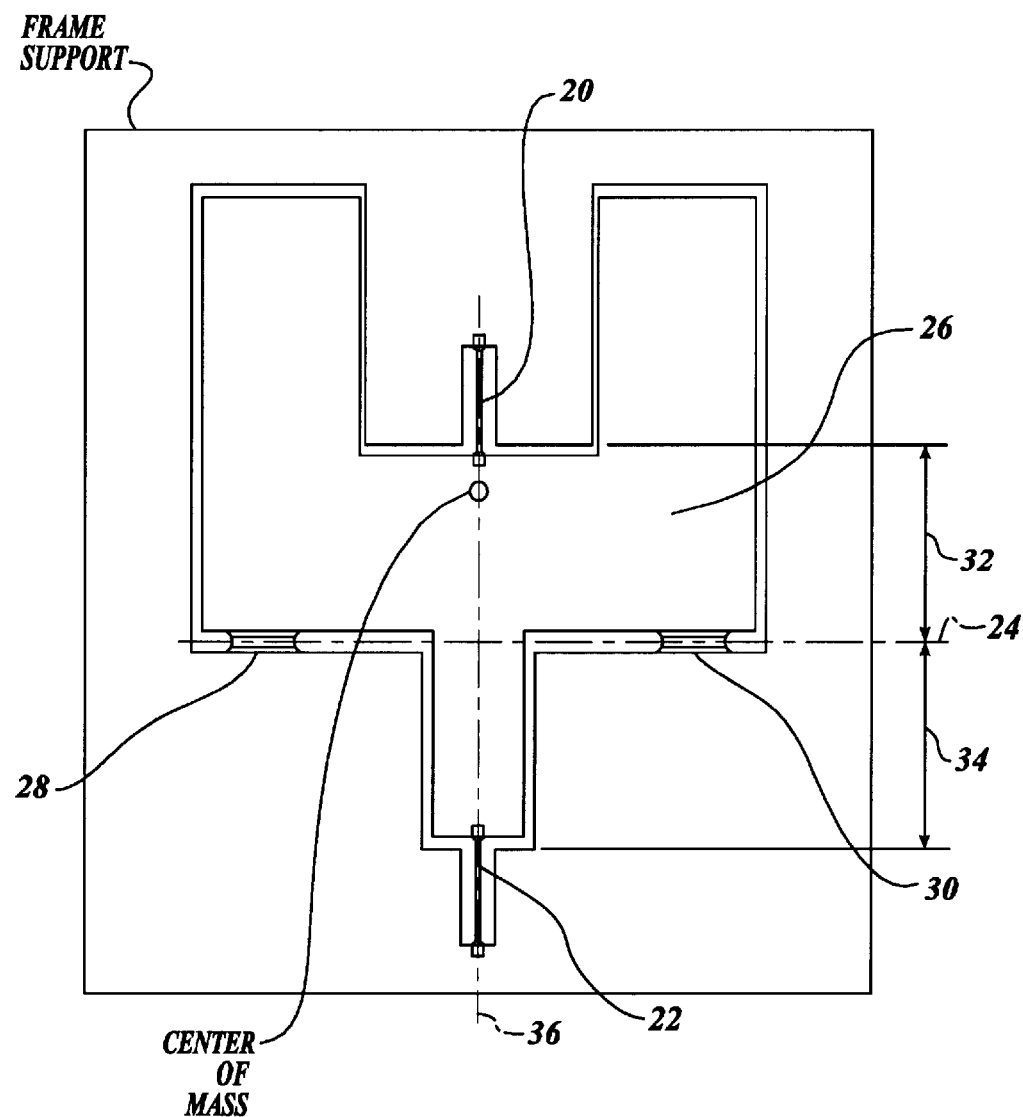
FIG. 2 is a plan view of a double-ended tuning fork device according to an embodiment of co-pending parent U.S. patent application Ser. No. 08/873,048.

FIG. 2 shows a plan view of an accelerometer constructed according to the parent application. FIG. 2 shows a configuration for the case where the two DETFs 20, 22 are the same size and shape and are positioned on opposite sides of the hinge axis 24 of the sensor proof mass 26, where hinge axis 24 is defined by the centerline of flexures 28, 30. According to the parent invention, positioning of DETFs 20, 22 such that the numerator, (a2-b2), in the second-order non-linearity equation $$\frac{(a_2 - b_2)}{(a_1 - b_1)}$$

is zero, or approximately zero, is accomplished by having the moving ends of both DETFs 20, 22 at essentially the same distance from hinge axis 24. In other words, in FIG. 2, distance 32 is equal or approximately equal to distance 34.

Positioning DETFs 20, 22 within hinges 28, 30 and close to the centerline 36 of proof mass 26 maintains good common mode characteristics. For example, when DETFs 20, 22 are misaligned with respect to centerline 36, a mechanical moment couple may be formed between DETFs 20, 22 which could limit the common mode tracking performance. Common mode tracking performance, or common mode cancellation, is the tracking and mutual cancellation of the common mode responses of two DETFs in a single sensor when the sensor is subjected to a vibration input or any other rapidly changing input. Such a couple is avoided according to the embodiment of FIG. 2 when DETFs 20, 22 are aligned with centerline 36.

According to the embodiment of the parent invention shown in FIG. 2, side loading is minimized and good bandwidth is maintained. For example, DETFs 20, 22 operate effectively within a +/-30 percent range of frequency change relative to their nominal no-load operating frequency. DETFs 20, 22 preferably operate within a +/-10 percent range of frequency change. In one example, if the DETFs are designed to operate at a nominal no-load frequency of 100,000 Hz, the change in frequency over the entire operating range of the sensor, from negative full scale input to positive full scale input, is preferably within +/-10 percent of the nominal no-load operating frequency. In the example where the DETFs are designed to operate at a nominal no-load frequency of 100,000 Hz, the DETFs are designed to operate in the range of 90,000 Hz to 110,000 Hz.

Furthermore, the configuration of FIG. 2 limits unit size and cost while improving performance. The performance improvements and reduced sensitivity to thermal effects and external stresses provided by the parent invention reduce sensitivity to manufacturing processes. Thus, lower cost for comparable performance is achieved in a comparable unit size.

The physical embodiment of FIG. 2 is achieved using the method of the parent invention in which an iterative approach is used to determine the preferred spacing between DETFs 20, 22 at which the K2 value of the difference frequency cancels or substantially cancels and the K2 values for individual DETFs 20, 22 are minimized for a given set of design constraints for a particular application through a sequence of calculations not relevant to the present invention but discussed in detail both below and in the parent application.

Figure 3:
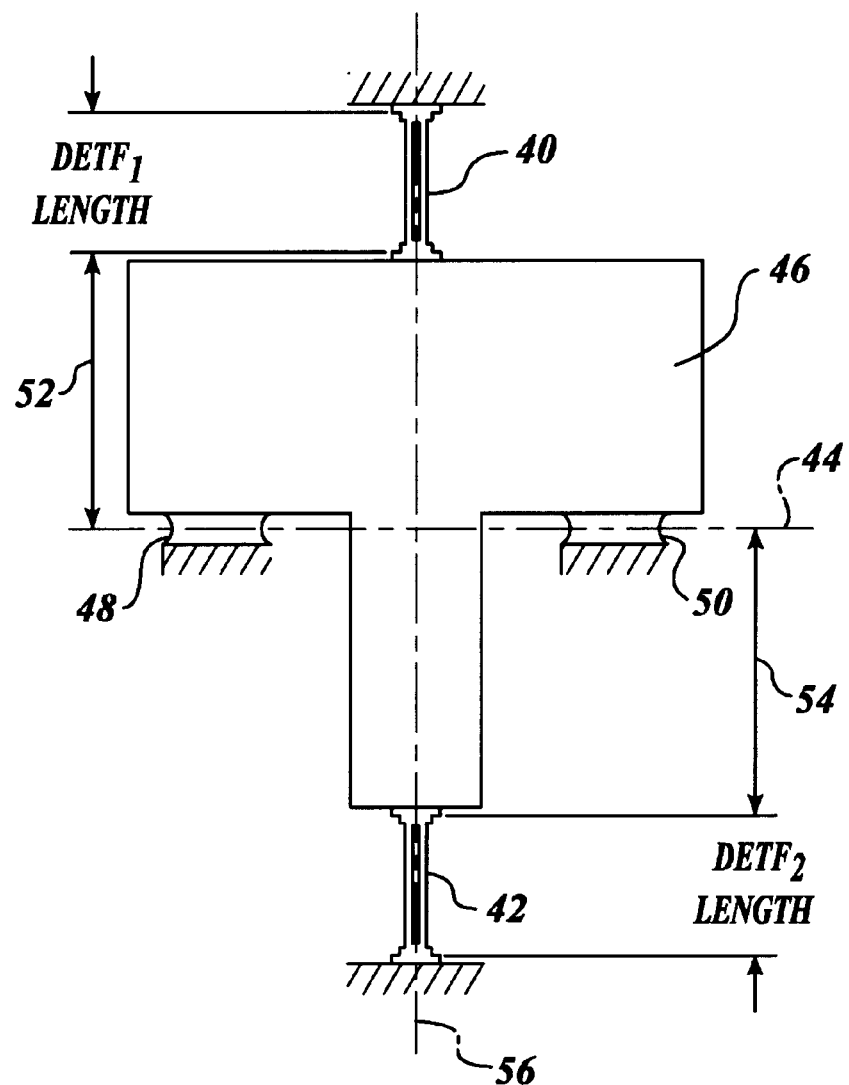
FIG. 3 is an illustration of DETF positioning according to an embodiment of co-pending parent U.S. patent application Ser. No. 08/873,048.

FIG. 3 is an illustration of DETF 40, 42 positioning for a specific application according to one embodiment of the parent invention which results in cancellation or substantial cancellation of the composite second-order non-linearity, K2, term and in which individual DETFs 40, 42 are designed to have minimum second-order non-linearity, K2, values.

In many practical applications the two DETFs are designed to differ in physical form to maximize performance including, for example, avoiding undesirable interactions between the two DETFs when the frequency outputs of the two DETFs cross during transition from positive to negative input. The cancellation of second order effects can also be accomplished for DETFs that differ in form. The cancellation requires positioning the ends at different, but definite, distances from the sensor hinge axis. Each DETF is located at a distance which is a definite multiple of the length of that DETF.

FIG. 3 shows a configuration for the case where first DETF 40 and second DETF 42 differ in size and shape and are positioned on opposite sides of the hinge axis 44, where hinge axis 44 is defined by the center of rotation of flexures 46, 48. According to the parent invention, positioning of DETFs 40, 42 such that the numerator, (a2–b2), of the second-order non-linearity term, $$\frac{(a_2 - b_2)}{(a_1 - b_1)},$$

is zero, or approximately zero, is accomplished by having the moving end of first DETF 40 positioned at a first distance 52 from hinge axis 44 and the moving end of second DETF 42 positioned at a second distance 54 from hinge axis 44. For example, the particular application described in FIG. 3, DETFs 40, 42 are 1864 microns and 1851 microns in length, respectively, formed in a wafer having a standard thickness of 525 microns. The positioning of DETFs 40, 42 according to the parent invention which results in substantially complete or substantially complete cancellation of the composite second-order non-linearity, K2, terms is accomplished by positioning first DETF 40 at a distance 52 equal to 2.44 times the length of DETF 40 from hinge axis 44 and positioning second DETF 42 at a distance 54 equal to 2.61 times the length of DETF 42 from hinge axis 44. In other words, in FIG. 3, distance 52 is equal to 2.44 times the length of first DETF 40 and distance 54 is equal to 2.61 times the length of second DETF 42. Positioning DETFs 40, 42 within hinges 48, 50 and close to the centerline 56 of proof mass maintains good common mode characteristics as discussed in reference to the embodiment of FIG. 2, above. Also as discussed in reference to FIG. 2, above, according to the embodiment shown in FIG. 3, side loading is minimized and good bandwidth is maintained.

Additional embodiments of the parent invention in the form of FIG. 3 are detailed in Table 2 including positioning of the two DETFs relative to hinge axis 44 at distances 52, 54 which are multiples of the individual lengths of each DETF 40, 42, and the degree of cancellation or composite second-order non-linearity term, K2, in hertz. The embodiment of FIG. 3 may utilize DETFs according to co-pending U.S. patent application Ser. No. 08/873,048 filed Jun. 11, 1997, the complete disclosure of which is incorporated herein by reference, which is similarly assigned to the assignee of the present patent application. Optionally, the DETFs may be constructed using any of the designs known to those of skill in the art.

The additional embodiments of FIG. 3 described in Table 2 may also utilize DETFs according to co-pending U.S. patent application Ser. No. 08/873,048 filed Jun. 11, 1997.

TABLE 2

| FIG. 3 Embodiments | Distance 52 (multiple of DETF 1 length) | Distance 54 (multiple of DETF 2 length) | Composite K2 (Hz) |
|---|---|---|---|
| 1 (shown) | 2.44 | 2.61 | 0 |
| 2 | 1.55 | 1.91 | 0 |
| 3 | 2.00 | 2.00 | −70 |
| 4 | 2.56 | 2.56 | −5 |
| 5 | 3.00 | 3.00 | −4 |

Figure 4:
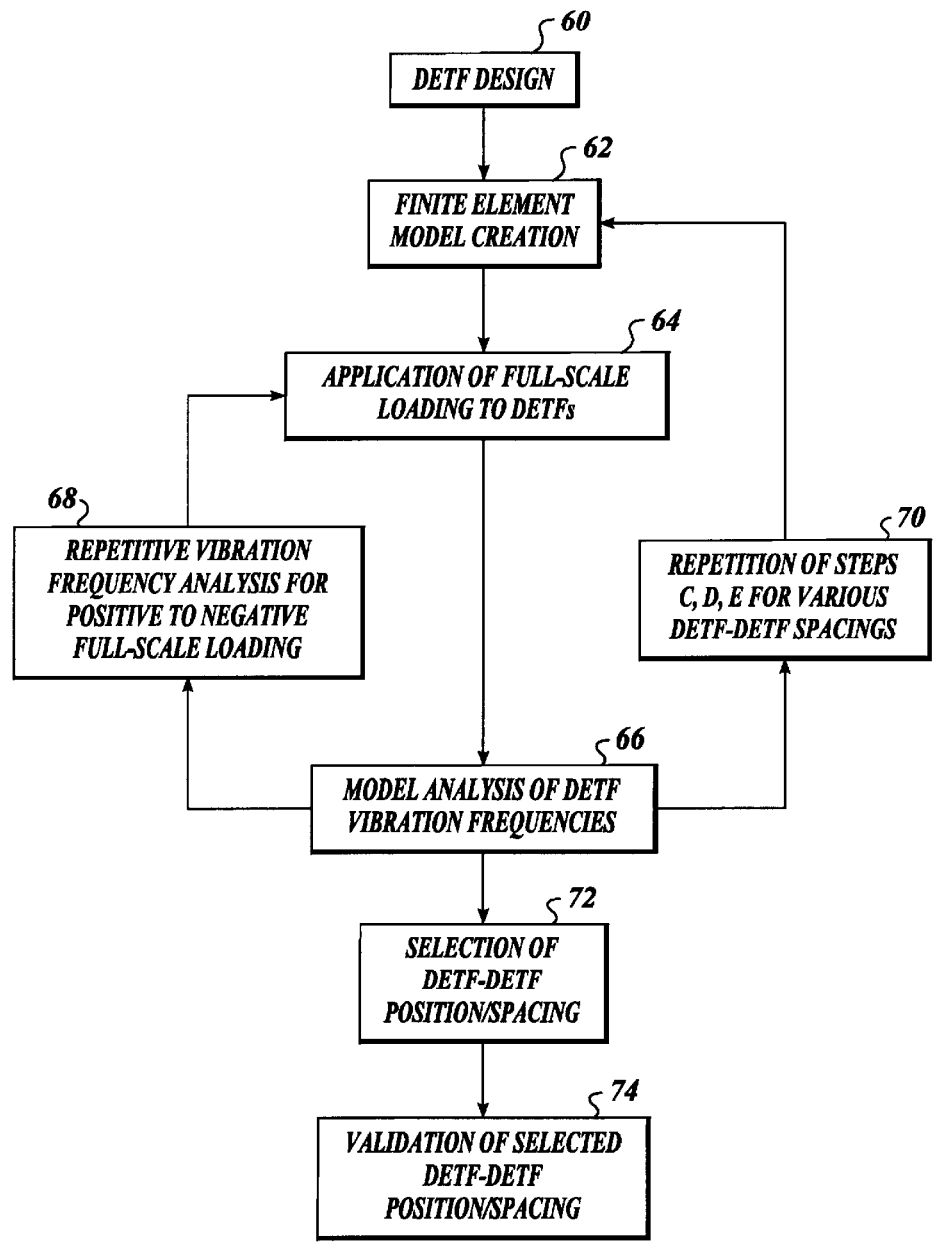
FIG. 4 is a flow chart representation describing the iterative method according to one embodiment of co-pending parent U.S. patent application Ser. No. 08/873,048.

FIG. 4 is a flow chart representation describing the iterative method used to achieve the physical embodiments shown in FIGS. 2 and 3. One method for implementing the parent invention is through the sequence of calculations outlined below, which are greatly simplified by the fact that none of the finite element model changes made in the course of the calculations cause a significant change in the accelerometer scale factor, where scale factor, K1, is the sensor's sensitivity to input force or acceleration. According to one embodiment of the present invention, the accelerometer of the parent invention may, for example, be designed as follows:

First step 60: DETF design. Design DETFs 20, 22 using classical formulae or finite element methods to give the desired nominal no-load frequencies and scale factors. Scale factor may be either frequency change per unit load or frequency change per unit extension. Use the well-known design rules, for example, those found in Lawrence's Modem Inertial Technology: Navigation, Guidance and Control, to ensure that DETFs 20, 22 possess equal, or very nearly equal, second order non-linearity, using the desired unit of measure, for example, micro-g/g2, milli-g/g2, or hertz. According to one embodiment of the parent invention, DETFs 20, 22 are designed using classical formulae or finite element methods to have second order non-linearity which are either a minimum or zero. Classical formulae for designing DETFs to give the desired nominal no-load frequencies and scale factors are described in, for example, U.S. Pat. No. 4,372,173, the complete disclosure of which is incorporated herein by reference. The finite element models may be created using, for example, ANSYS, NASTRAN, COSMOS, or other suitable finite element modeling programs capable of Eigen value extraction.

Second step 62: Finite element model creation. Create a finite-element model including, as a minimum, DETFs 20, 22 and sensor hinges 28, 30 connected together at one end by a very stiff structure, preferably a massless structure, representing the proof mass. The DETF length is typically on the order of 1,500 microns. Hinges 28, 30 are preferably on the order of 100 to 200 microns in length, and are preferably as thick as possible without seriously degrading sensor performance. Design factors beyond the scope of this or the parent specification may enter in the selection of hinge 28, 30 dimensions. Generally, the ratio of DETF length to hinge length is preferably as large as practical, for example, the ratio of DETF length to hinge length is preferably in a range from 8:1 to 20:1 or more. The other ends of the DETFs are fixed or solidly connected to an immobile structure. The distance from the plane defined by DETFs 20, 22 to hinge axis 24 should be the same as that intended for use in the actual accelerometer. In a typical silicon sensor, this distance is a fixed fraction of the wafer thickness. Typically, the hinge is formed at the centerline of the substrate such that the distance from the plane defined by the DETFs to the hinge axis is one half the thickness of the substrate.

Third step 64: Application of full-scale loading. Within the finite element model, apply model-forces to the connecting structure to cause it to rotate to the degree the actual proof mass 26 is expected to turn for a full-scale input. In addition, apply full-scale acceleration loading directly to DETFs 20, 22, so that the finite element model results includes the effects of DETF 20, 22 deformations due to the side loading that will be present in an actual accelerometer. Attainment of a full-scale displacement can be deduced from the frequency changes in DETFs 20, 22 compared to their unloaded values.

Fourth step 66: Model analysis. Use the non-linear analysis capabilities of the finite element analysis program to find the vibration frequencies of DETFs 20, 22 in a deformed, pre-stressed state. Record the frequencies.

Fifth step 68: Repetitive vibration frequency analysis. Repeat vibration frequency analysis of fourth step 66 to find the frequencies of DETFs 20, 22 for at least four more loads between negative full-scale and positive full-scale. Use curve-fitting techniques known to those of skill in the art to find the non-linearity in the difference frequency.

Sixth step 70: Repetitive finite element analysis. Create finite-element models for various DETF-to-DETF spacings between DETFs 20, 22. Repeat loading and vibration frequency analysis of third step 64 through fifth step 68 for various DETF-to-DETF spacings between DETFs 20, 22 to create a model of second-order non-linearity as a function of DETF-to-DETF spacing.

Seventh step 72: DETF-to-DETF positioning/spacing selection. Select the positions of DETFs 20, 22, or the spacing between DETFs 20, 22 where the composite second-order non-linearity is either a minimum or zero. In other words, select the positions of DETFs 20, 22, or the spacing between DETFs 20, 22 where the respective second-order non-linearity values of DETFs 20, 22 cancel or substantially cancel.

Eighth step 74: Validation of selected DETF-to-DETF positioning/spacing selection. Create a complete design embodying the DETF-to-DETF positioning or spacing selected in seventh step 72, being certain that the center of mass of the proof mass is located appropriately to produce the rotations at full-scale that were assumed in defining DETF 20, 22 positions.

Those of skill in the art will realize that the optimal design from the standpoint of K2 cancellation may not be the best from other standpoints. In particular, implementation of K2 cancellation may require a larger piece of silicon to manufacture. Those of skill in the art will realize that selection of the best DETF positions according to the parent invention for the overall accelerometer should consider all pertinent factors, not just K2. Pertinent factors may include, for example, the desired scale factor, third-order affects, and other performance goals of the sensor or accelerometer.

Figure 5:
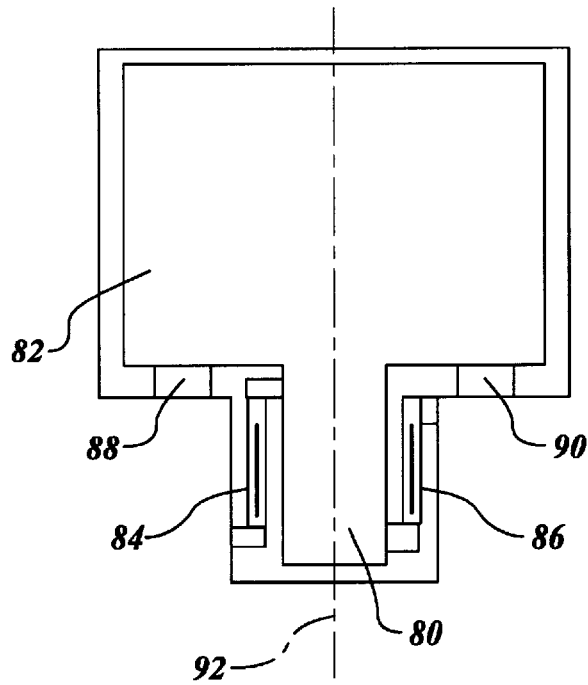
FIG. 5 is a plan view of a double-ended tuning fork device according to an embodiment of co-pending parent U.S. patent application Ser. No. 08/873,048.

FIG. 5 illustrates another embodiment of the parent invention. The embodiment of FIG. 5 includes a projection 80 on the proof mass 82 which allows positioning the DETFs 84, 86 within the hinges 88, 90 and close to the centerline 92 of proof mass 82 between hinges 88, 90. As noted in the discussion of FIG. 2, above, positioning DETFs 84, 86 away from centerline 92 between hinges 88, 90 may reduce common mode tracking performance. However, according to the embodiment of the invention depicted in FIG. 5, DETFs 84, 86 are moved close to centerline 92 which limits the effects of geometry on common mode tracking performance. DETFs 84, 86 may be positioned as close to centerline 92 as processing techniques allow, but DETFs 84, 86 are preferably separated by a minimum distance such that cross-coupling is avoided. In one example, DETFs 84, 86 are separated by 800 microns.

Figure 6:
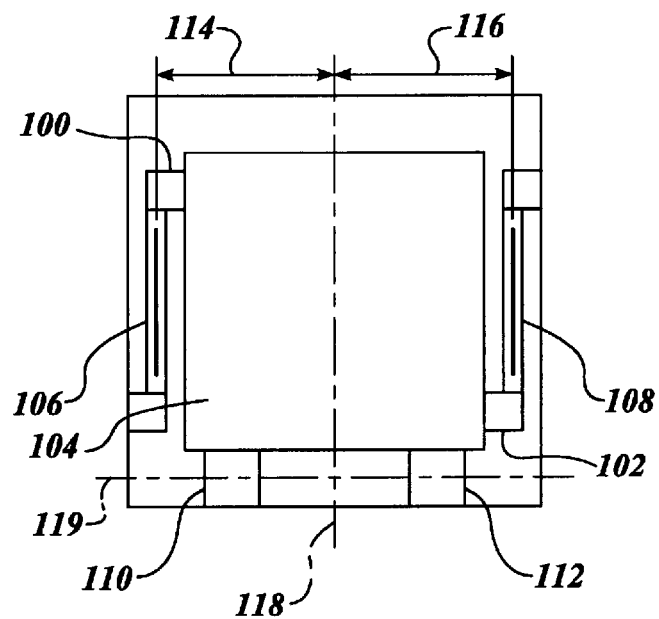
FIG. 6. is a plan view of a double-ended tuning fork device according to an embodiment of co-pending parent U.S. patent application Ser. No. 08/873,048.

FIG. 6 illustrates another embodiment of the parent invention. The embodiment of FIG. 6 includes projections 100, 102 on the sides of proof mass 104 which allow positioning the DETFs 106, 108 on either side of proof mass 104 and outside hinges 110, 112 at distances 114, 116 from centerline 118. As noted in the discussion of FIG. 2, above and in the parent application, positioning DETFs 106, 108 away from centerline 118 may reduce common mode tracking performance. However, according to the embodiment of the parent invention depicted in FIG. 6, the relatively greater cross-axis stiffness of hinges 110, 112 compared to the negligible stiffness of DETFs 106, 108 limits the effects of geometry on common mode tracking performance. In a practical accelerometer, cross-axis stiffness of hinges 110, 112 may be 100 or more DETFs 106, 108. Further, the embodiment of FIG. 6 provides the minimum sensor area for a desired sensor response or scale factor, which increases the number of mechanisms that can be fabricated per silicon wafer, thereby lowering unit cost. According to one particular embodiment of the parent invention according to FIG. 6, DETFs 106, 108 are 1804 microns and 1800 microns in length, respectively, formed in a 525 micron thick wafer. The moving end of DETF 106 is positioned at 1.47 times the length of DETF 106 from the hinge axis 119 formed at the center of rotation of hinges 110, 112 and the moving end of DETF 108 is positioned at 0.32 times the length of DETF 108 from hinge axis 119.

Figure 7:
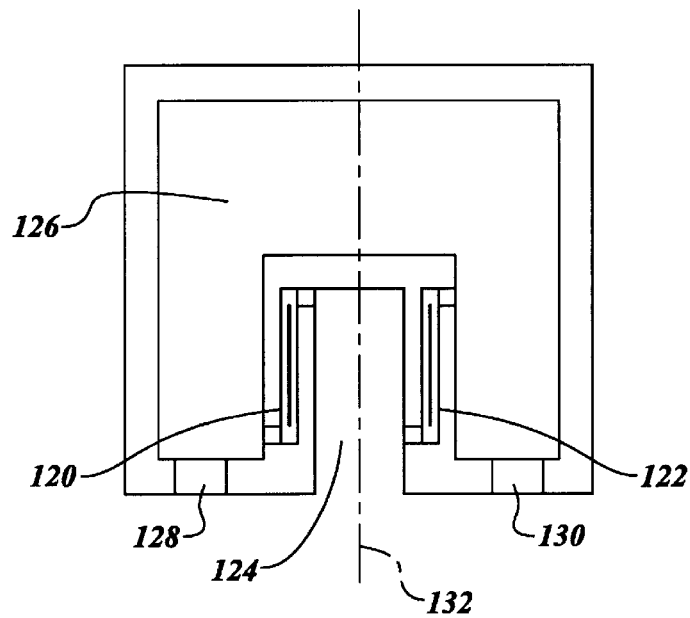
FIG. 7 is another plan view of a double-ended tuning fork device according to an embodiment of co-pending parent U.S. patent application Ser. No. 08/873,048.

FIG. 7 illustrates another embodiment of the parent invention. The embodiment of FIG. 7 eliminates the projection on the proof mass shown in FIGS. 2, 3 and 5 by mounting the DETFs 120, 122 to a frame projection 124 within the proof mass 126 structure. The embodiment of FIG. 7 includes a new configuration for proof mass 126. The embodiment of FIG. 7 maximizes pendulousity for proof mass size, minimizes hinge side loading which may reduce common mode tracking performance and allows maximum separation between flexure hinges. pendulousity of the proof mass is maximized by positioning DETFs 120, 122 within the hinges 128, 130 and close to the centerline 132 of proof mass 126 to maintain good common mode performance. Thus, side loading is reduced and good bandwidth as defined above is maintained. Unit size and cost are kept to a minimum while performance is improved. By eliminating projection 80 and thus reducing the overall area of the mechanism, the embodiment of FIG. 7 also increases the number of mechanisms that can be fabricated per silicon wafer, thus, lowering unit cost.

The tines of DETFs are formed in the silicon wafer by an etching process well known to those of skill in the art. The tines of DETFs are typically formed in the silicon wafer by masking the wafer with a mask having the desired tine shape and coating the exposed areas of the wafer with a substance which is impervious to silicon-etching chemicals. The mask is removed and the wafer is exposed to a silicon-etching chemical whereby the wafer material around the DETF tines is dissolved thus forming the tines in the silicon wafer. The wafer may be repeatedly exposed to the masking and etching process using different shaped masks designed to progressively reveal a tine having the desired shape and the desired degree of detail.

Figure 8:
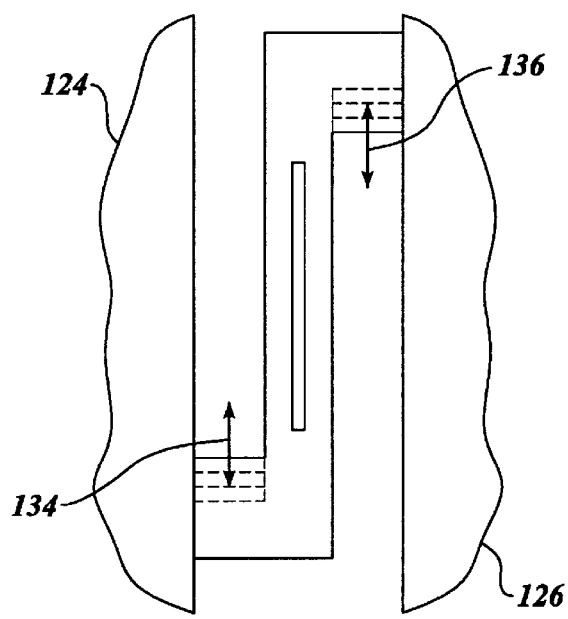
FIG. 8 is a detailed plan view of a double-ended tuning fork device according to an embodiment of co-pending parent U.S. patent application Ser. No. 08/873,048.

FIG. 8 is a detailed plan view of a double-ended tuning fork device according to an embodiment of the parent invention. The structure of FIG. 7 including DETFs 120, 122 is formed in part using silicon etching techniques known to those of skill in the art and described, for example, in U.S. Pat. Nos. 4,597,003 and 4,783,237 and co-pending U.S. patent application Ser. No. 09/350,323, Method of Machining Glass, filed in the name of Amy V. Skrobis on Jul. 9, 1999, the complete disclosures of which are incorporated herein by reference. FIG. 8 shows an enlarged view of DETF 120. The effective interface points between DETF 120 and proof mass 126 and between DETF 120 and projection 124 are the effective end points of the DETF tines. Possible adjustments of the interface to both proof mass 126 and frame projection 124 are indicated in FIG. 8 by dotted lines. A single repetition of the masking and etching process can relocate the effective interface point as indicated by arrows 134, 136. Relocation of the effective interface point is a simple cost effective approach for tuning both individual DETFs 120, 122 second-order non-linearity, K2, terms and the composite second-order non-linearity, K2, term. This adjustment or tuning technique used in conjunction with any of the various embodiments described herein provides additional cost effective and schedule effective performance optimization of vibrating beam force sensors and accelerometers using only one mask for the relocation of the effective interface point.

Preferred embodiments of the parent invention have been described. Variations and modifications will be readily apparent to those of skill in the art.

The Present Invention

In a practical sensor, the second-order non-linearity terms of the individual DETFs, a2 and b2, will not exactly match because of design considerations and manufacturing tolerances. Furthermore, in a practical accelerometer, because one end of each of the DETFs is fixed to a solid support structure while the other moves with the proof mass, the two DETFs experience deformations, including rotations and transverse displacements, not accounted for when the DETFs have been designed to have equal second-order non-linearity values when subjected to purely axial forces. Thus, the second and third order non-linearity values, 2; and K3, respectively, will not cancel in a practical accelerometer even when the DETFs are designed to be identical.

Various embodiments of the present invention overcome this lack of composite second-order cancellation by providing one or more trim balancing tabs positioned at predetermined points along the length of each of the two DETFs in a practical accelerometer which provides substantially complete cancellation or elimination of second-order, K2, non-linearity effects. Other aspects physical embodiments which place the trim balancing tabs or "trim tabs," on the two DETFs such that the individual DETF second order values of the two DETFs are substantially equalized and the composite second-order terms cancel.

A double ended tuning fork (DETF) resonator has an inherent non-linear scale factor term, known as K2. One type of DETF is described in U.S. Pat. No. 5,996,411. This term is trimmed or "fine-tuned" on individual DETFs by the introduction of a mass balance located on the edge of the DETF tines. Depending upon the mass volume and location of the balance on the tines, the second-order, K2, term can be adjusted higher or lower. When two DETF are employed in a sensor, such as an accelerometer, the K2 of each DETF can be adjusted to be of the same sign and magnitude. The result is a highly linear practical accelerometer.

The present invention includes positioning trim balancing tabs projecting from each of the DETFs such that second-order non-linearity of the two DETFs are of substantially identical sign and magnitude under the deformations that they actually undergo in use, including rotation and transverse displacement. Thus, the second-order non-linearity is thus absent by cancellation from the difference frequency. The accelerometer of the present invention places the trim balancing tabs on the DETFs such that the second-order terms, a2 and b2, cancel or substantially cancel when both axial and transverse forces are considered.

As noted above, with reference to the general expressions of non-linearity above, the composite second-order term in the difference frequency cancels when the difference in the individual DETF coefficient terms, a2−b2, equals zero. Thus, the accelerometer of the present invention places the trim tabs on the DETFs such that the expression a2−b2 is equal to zero, or approximately zero.

The attachment locations of the trim tabs on the two DETFs directly affect second order non-linearity performance. The invention of the present application provides various embodiments which overcome the problems of the prior art by providing trim tabs positioned along the length of each of the two DETFs which minimize or eliminate second-order, K2, non-linearity effects by equalizing the individual DETF second-order, K2, non-linearity coefficient terms. The present invention is effective in both high-g force operation in excess of 100 g's and in high vibration environments as well as in lower force and vibration ranges. Furthermore, the present invention is realized in geometry features; thus, no external environment nulls-out or degrades sensor performance. In other words, there is no theoretical limit on the range of g-force input or vibration environment in which the invention may operate.

The tines of DETFs, including the trim balancing tabs, are formed in the silicon wafer by an etching process well known to those of skill in the art, such as one of those processes mentioned above. The tines of DETFs are typically formed in the silicon wafer by masking the wafer with a mask having the desired tine shape and coating the exposed areas of the wafer with a substance which is impervious to silicon-etching chemicals. The mask is removed and the wafer is exposed to a silicon-etching chemical whereby the wafer material around the DETF tines is dissolved thus forming the tines in the silicon wafer. The wafer may be repeatedly exposed to the masking and etching process using different shaped masks designed to progressively reveal a tine having the desired shape and the desired degree of detail, including the trim balancing tabs.

Figure 9:
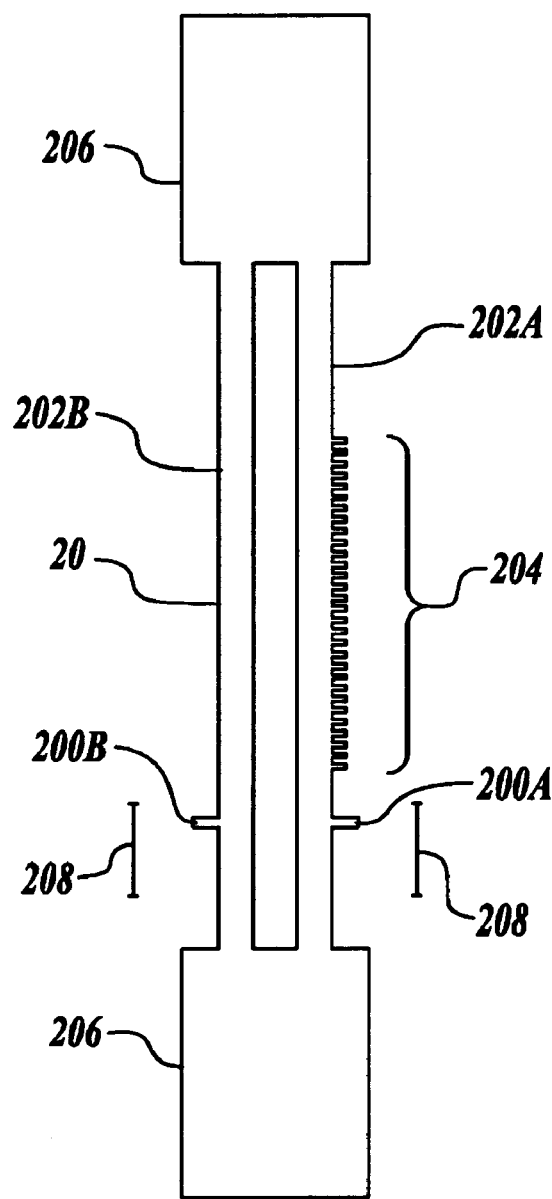
FIG. 9 is a detailed plan view of a double-ended tuning fork device according to an embodiment of the present invention.

FIG. 9 is a detailed plan view of a double-ended tuning fork device according to an embodiment of the present invention. The structure of FIG. 7 including DETFs 120, 122 is formed in part using silicon etching techniques known to those of skill in the art and described, for example, in above incorporated U.S. Pat. Nos. 4,597,003 and 4,783,237 and co-pending patent application Ser. No. 09/350,323. FIG. 9 shows an enlarged view of DETF 120 configured with trim balancing tabs according to the present invention. One or more mass balances or "trim balancing tabs" 200 are located on the edge of the DETF tines 202A and 202B for trimming or "fine-tuning" the second-order, K2, term on individual DETFs. The mass volume and location of trim balance tabs 200A and 200B on respective tines 202A, 202B is adjusted according to the invention to adjust the second-order, K2, higher or lower. Preferably, trim tabs 200 are located along the length of tines 202 between the electrostatic drive combs 204 and the effective end points 206 of the DETF tines.

Preferred adjustments of the location of trim tabs 200 are indicated in FIG. 9 by arrows 208. Additionally, the mass volume of each trim tab 200 is individually adjusted to match or equalize the second-order, K2, non-linearity terms such that the respective non-linearity of the two DETFs effectively cancel when the difference frequency is formed. Introduction of the trim balance tabs 200 on the tines of DETF 120 is a simple, cost effective approach for tuning both individual DETFs 120, 122 second-order non-linearity, K2, terms and the composite second-order non-linearity, K2, term. This adjustment or tuning technique used in conjunction with any of the various embodiments described herein provides additional cost effective and schedule effective performance optimization of vibrating beam force sensors and accelerometers using only one mask for the relocation of the effective interface point.

Figure 10:
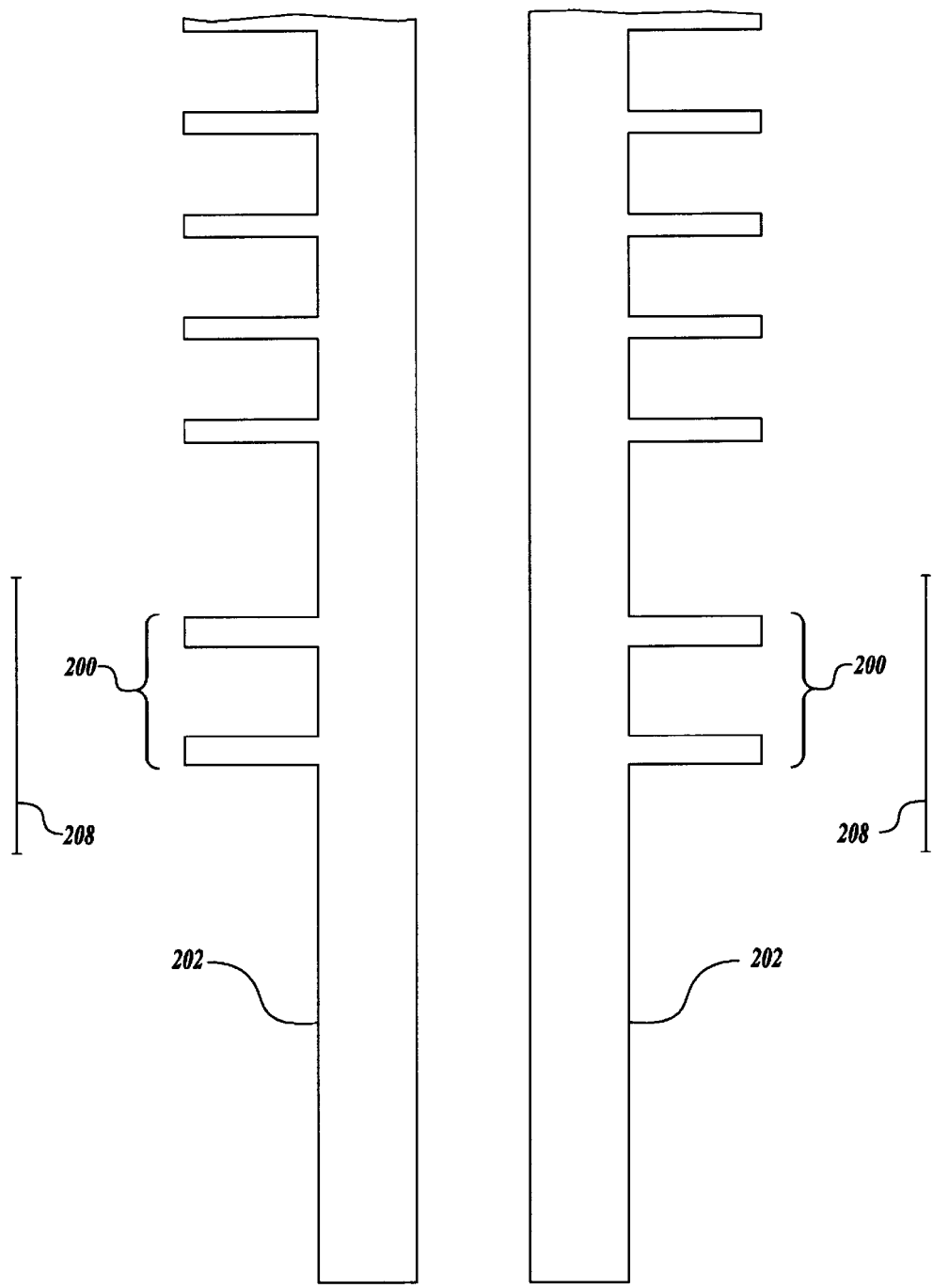
FIG. 10 is a detailed plan view of a double-ended tuning fork device according to an alternative embodiment of the present invention.

FIG. 10 illustrates another embodiment of the trim balancing tabs of the invention in which multiple trim balancing tabs 200 through 200N are introduced along the length of each tine 202 of DETF 20. Trim balancing tabs 200 through 200N of an appropriate mass volume are moved as indicated by arrows 208 to appropriate locations along the length of each tine of DETF 20 as required to match or equalize the second-order, K2, non-linearity terms of the two DETFs. Trim balancing tab configurations, i.e., mass volumes, quantities and locations, are determined for each application as a function of the desired degree of linearity in combination with other design considerations and constraints.

Figure 11:
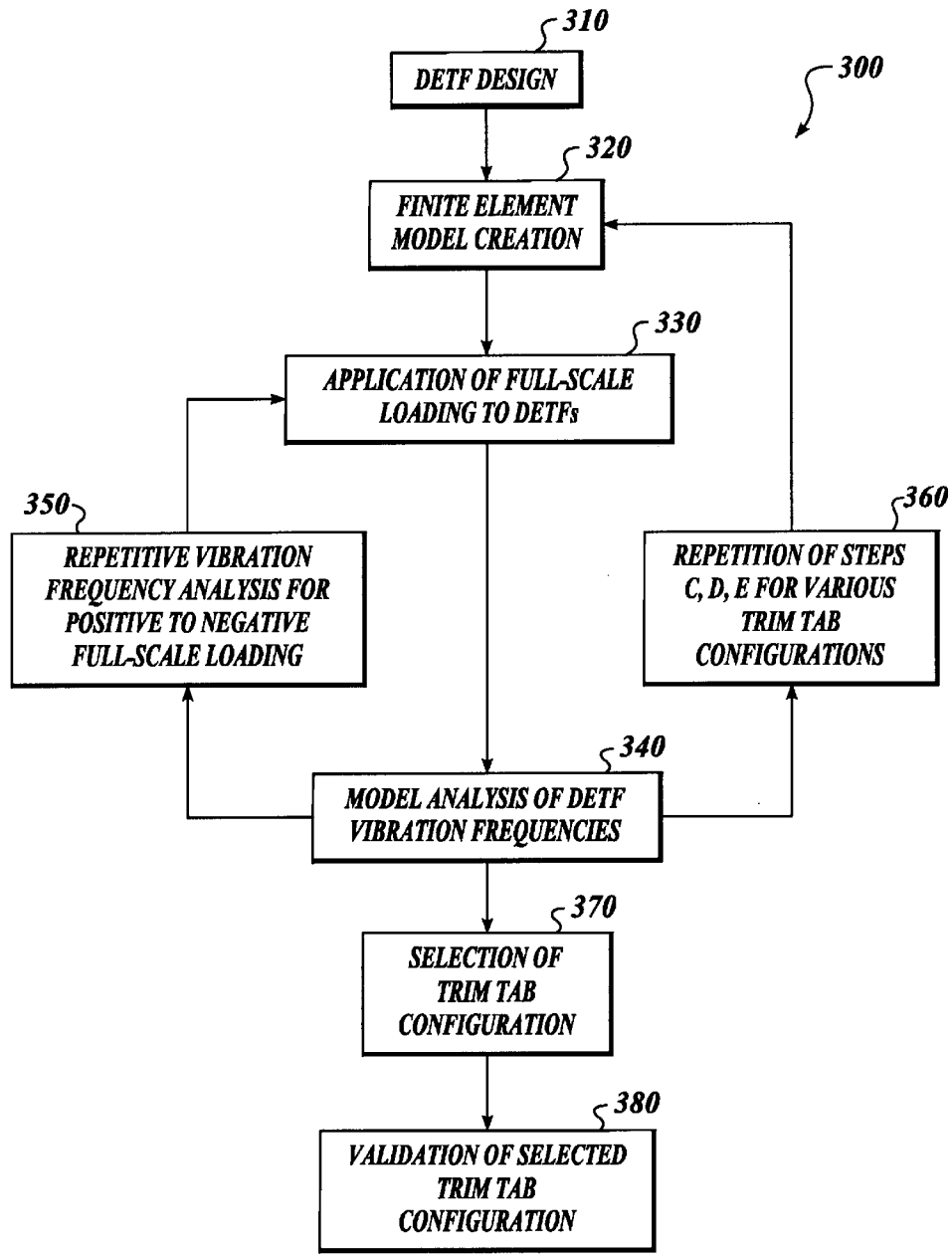
FIG. 11 is a flow chart representation describing the iterative method according to one embodiment of the present invention.

FIG. 11 is an illustrative flow chart representation 300 describing the iterative method used to achieve the physical embodiments of a DETF accelerometer shown in FIGS. 2 and 3, or another of the physical embodiments described herein, using the physical embodiments of a DETF shown in FIGS. 9 and 10. One method for implementing the parent invention is through the sequence of calculations outlined below, which are greatly simplified by the fact that none of the finite element model changes made in the course of the calculations cause a significant change in the accelerometer scale factor, where scale factor, K1, is the sensor's sensitivity to input force or acceleration. According to one embodiment of the present invention, the accelerometer of the parent invention may, for example, be designed as follows:

First step 310: DETF design. Design DETFs 20, 22 using classical formulae or finite element methods, as described above in step 60 of FIG. 4, to give the desired nominal no-load frequencies and scale factors. As mentioned above, scale factor may be either frequency change per unit load or frequency change per unit extension. The well-known design rules discussed above are used to ensure that DETFs 20, 22 possess equal, or very nearly equal, second order non-linearity, using the desired unit of measure, for example, micro-g/g2, milli-g/g2, or hertz. According to one embodiment of the present invention, DETFs 20, 22 are designed to have second order non-linearity which are either a minimum or zero. DETFs 20, 22 are designed using classical formulae as described in, for example, above incorporated U.S. Pat. No. 4,372,173, or using finite element methods, the finite element models may be created using, for example, ANSYS, NASTRAN, COSMOS, or other suitable finite element modeling programs capable of Eigen value extraction.

Second step 320: Finite element model creation. Create a finite-element model, as described above in step 62 of FIG. 4, including, as a minimum, DETFs 20, 22 and sensor hinges 28, 30 connected together at one end by a very stiff structure, preferably a massless structure, representing the proof mass. The DETF length is typically on the order of 1,500 microns. Hinges 28, 30 are preferably on the order of 100 to 200 microns in length, and are preferably as thick as possible without seriously degrading sensor performance. Design factors beyond the scope of this or the parent specification may enter in the selection of hinge 28, 30 dimensions. Again, the ratio of DETF length to hinge length is generally preferably as large as practical, for example, the ratio of DETF length to hinge length is preferably in a range from 8:1 to 20:1 or more. The other ends of the DETFs are fixed or solidly connected to an immobile structure. The distance from the plane defined by DETFs 20, 22 to hinge axis 24 is preferably the same as that intended for use in the actual accelerometer. As discussed above, in a typical silicon sensor, this distance is a fixed fraction of the wafer thickness. Typically, the hinge is formed at the centerline of the substrate such that the distance from the plane defined by the DETFs to the hinge axis is one half the thickness of the substrate.

Third step 330: Application of full-scale loading. As described above in step 64 of FIG. 4, within the finite element model, apply model-forces to the connecting structure to cause it to rotate to the degree the actual proof mass 26 is expected to turn for a full-scale input. In addition, apply full-scale acceleration loading directly to DETFs 20, 22, so that the finite element model results includes the effects of DETF 20, 22 deformations due to the side loading that will be present in an actual accelerometer. Attainment of a full-scale displacement is deduced from the frequency changes in DETFs 20, 22 compared to their unloaded values.

Fourth step 340: Model analysis. Use the non-linear analysis capabilities of the finite element analysis program to find the vibration frequencies of DETFs 20, 22 in a deformed, pre-stressed state, as described above in step 66 of FIG. 4. Record the frequencies.

Fifth step 350: Repetitive vibration frequency analysis. Repeat vibration frequency analysis of fourth step 340 to find the frequencies of DETFs 20, 22 for multiple, preferably at least four, more loads between negative full-scale and positive full-scale, as described above in step 68 of FIG. 4. Use curve-fitting techniques known to those of skill in the art to find the non-linearity in the difference frequency.

Sixth step 360: Repetitive finite element analysis. Create finite-element models for DETFs 20, 22 having various trim balance tabs 200. In other words, fit the finite-element models for DETFs 20, 22 with trim balance tabs 200 having various mass volumes and locations along the length of the tines. As mentioned above, trim tabs 200 are preferably located along the length of tines 202 between the drive combs 204 and the effective end points 206 of the DETF tines. The comb tooth area is thereby effectively reserved for the comb drive. Various alternative convenient positions for trim tabs 200 are also contemplated by the present invention. For example, trim tabs 200 are alternatively located within the field of the comb drive, either as a functional or a nonfunctional comb tooth 204. Whether functional or nonfunctional, trim tab 200 fashioned as a comb tooth 204 within the comb drive field is alternatively either sized similarly to comb teeth 204, or is sized either larger or smaller than comb teeth 204, as recommended by the repetitive finite element analysis.

Typically, the second-order, K2, non-linearity term for a single DETF is on the order of a few hundred micro-g's to 500 micro-g's or more. However, the invention of the parent application provides positioning the ends of the DETFs attached to the proof mass, which are the ends that move, such that second-order, K2, non-linearity of the two DETFs will be the same or substantially the same, under the deformations that they actually undergo in use, including rotation and transverse displacement. The accelerometer of the parent application places the ends of DETFs 20, 22 such that the second-order terms, a2 and b2, cancel or substantially cancel when both axial and transverse forces are considered. For example, the difference in the second-order, K2, non-linearity of the two DETFs is often reduced into the range of only a few micro-g's, even within a range of about 0 to 10 micro-g's. Thus, the second-order non-linearity is absent or substantially absent from the difference frequency before fine tuning the respective second-order, K2, non-linearity terms according to the present invention. The present invention is most effective in combination with configurations of DETFs having common mode differences in this narrow 0 to 10 micro-g range.

With reference to the general expressions of non-linearity above, the composite second-order term in the difference frequency cancels when the difference in the individual DETF coefficient terms, a2–b2, equals zero. Thus, while the accelerometer of the parent application places the ends of the DETFs such that a2–b2 is small or nearly equal to zero, the accelerometer of the present invention adds one or more trim balancing tabs 200 through 200N that substantially equalize the coefficient terms, a2, b2, and drive the composite second-order term in the difference frequency substantially to zero.

According to the iterative method of the invention for determining the configuration of trim balancing tabs 200, a slight increase or decrease in the second-order, K2, non-linearity term for a single DETF is gained by moving trim tabs along the length of tines 202. Increasing the mass volume of trim tabs 200 and moving them toward the center or comb drive portion of tines 202 generally increases the effect on the second-order, K2, non-linearity term, while decreasing the mass volume and moving trim tabs 200 toward the effective end points 206 of DETF 20 has less effect on the second-order, K2, non-linearity term. Trim tabs 200 are generally expected to have substantially the same configuration on each tine 202 of DETF 20, i.e., the trim tabs 200 are symmetric along the longitudinal axis of DETF 20. Trim tabs 200 are preferably fabricated in the plane of DETF 20 to avoid changing the thickness of the active layer, thereby maintaining manufacturability.

Loading and vibration frequency analysis of third step 330 through fifth step 350 are repeated, as described above in step 70 of FIG. 4, for various trim tab 200 configurations, i.e., mass volumes, quantities and locations, to create a model of second-order non-linearity as a function of trim tab configuration.

Seventh step 370: DETF trim tab configuration selection. Select the mass volume, quantity and location or locations of trim balance tabs 200 for DETFs 20, 22 where the composite second-order non-linearity is either identical or substantially identical for each of DETFs 20, 22. In other words, select the mass volume and positions of trim balance tabs 200 for DETFs 20, 22 where the respective second-order non-linearity values of DETFs 20, 22 cancel or substantially cancel.

Eighth step 380: Validation of selected DETF trim balancing tab configuration selection. As described above in step 74 of FIG. 4, create a complete design embodying the DETF trim balancing tab configuration selected in seventh step 370, being certain that the center of mass of the proof mass is located appropriately to produce the rotations at full-scale that were assumed in defining DETF 20, 22 positions.

Those of skill in the art will realize that the optimal design from the standpoint of K2 cancellation may not be the best from other standpoints. In particular, implementation of K2 cancellation may require a larger piece of silicon to manufacture. Those of skill in the art will realize that selection of the best DETF positions according to the parent invention and trim balancing tab configuration according to the present invention for the overall accelerometer should consider all pertinent factors, not just K2. Pertinent factors may include, for example, the desired scale factor, third-order affects, and other performance goals of the sensor or accelerometer.

While the preferred embodiment of the invention has been illustrated and described, it will be appreciated that various changes can be made therein without departing from the spirit and scope of the invention.

What is claimed is:

1. A method for designing double-ended tuning fork (DETF) sensors such that the second-order non-linearity of a first DETF and of a second DETF substantially cancel, the method comprising the steps of:
    a. designing said first and said second DETF using finite-element methods, said design including nominal no-load frequencies and scale factors, and said DETFs having substantially equal second-order non-linearity terms;
    b. creating a finite-element model, said finite-element model including at least:
        said first DETF,
        said second DETF having at least one mass balance formed thereon,
        a movable structure,
        a fixed support structure,
        at least one hinge member rotatably connecting said movable structure to said fixed structure, and
        said first and second DETFs spaced apart and connected between said movable structure and said fixed structure;
    c. within said finite-element model, applying forces to said movable structure to cause said movable structure to rotate about said hinge member and applying full-scale force loadings directly to said DETFs;
    d. within said finite-element model, said DETFs being in a deformed, pre-stressed state, using non-linear analysis to find a vibration frequency F1 of said first DETF and a vibration frequency F2 of said second DETF;
    e. repeating step (d) for a plurality of different forces, said forces being between a negative full-scale force and a positive full-scale force;
    f. using curve-fitting techniques to find the non-linearity in the difference frequency, where said difference frequency equals F1–F2;
    g. repeating steps c, d, e and f for a plurality of mass balance configurations;
    h. creating a model of second order non-linearity as a function of said mass balance configurations; and
    i. selecting said mass balance configurations such that said difference frequency is a minimum.

2. The method recited in claim 1, wherein said mass balance configuration further comprises mass balance and mass balance location.

3. The method recited in claim 2, further comprising the step of verifying said mass balance configurations by creating a complete design embodying said mass balance configurations.

4. The method recited in claim 3, wherein said first and second DETFs are designed using classical formulae.

5. The method recited in claim 4, wherein said finite-element design of said DETFs includes subjecting said DETFs to deformations, including rotation and transverse displacement, experienced in actual use.

6. The method recited in claim 5, wherein said selected mass balance configuration is a mass balance configuration whereby a second second-order non-linearity term associated with said second DETF is substantially identical to a first second-order non-linearity term associated with said second DETF.

7. The method recited in claim 6, wherein said creating a finite-element model step further includes creating said finite-element model having at least one mass balance formed on said first DETF.

8. A method for designing double-ended tuning fork (DETF) sensors such that the second-order non-linearity of a first DETF and of a second DETF substantially cancel, the method comprising the steps of:
    a. designing said first and said second DETFs using finite-element methods, said design including nominal no-load frequencies and scale factors and including subjecting said DETFs to deformations with rotation and transverse displacement experienced in actual use, and said DETFs having substantially equal second-order non-linearity terms;

b. creating a finite-element model, said finite-element model including at least
said first and said second DETFs, each said DETF having one or more mass balance projecting therefrom,
a movable proof mass,
a fixed support frame,
at least one hinge rotatably connecting said movable proof mass to said fixed support frame, and
said first and second DETFs spaced apart and connected between said movable proof mass and said fixed support frame;

c. within said finite-element model, applying forces to said movable proof mass causing said movable proof mass to rotate about said hinge and applying full-scale force loadings directly to said DETFs;

d. within said finite-element model, said DETFs being in a deformed, pre-stressed state, using non-linear analysis to find a vibration frequency F1 of said first DETF and a vibration frequency F2 of said second DETF;

e. repeating step d for at least four different forces, said forces being between a negative full-scale force and a positive full-scale force;

f. using curve-fitting techniques to find the non-linearity in the difference frequency, where said difference frequency equals F1–F2;

g. repeating steps c, d, e and f for a plurality of different mass balance configurations for each said first DETF and said second DETF;

h. creating a model of second order non-linearity as a function of said mass balance configurations relative to each said first DETF and said second DETF;

i. selecting said mass balance configurations where said difference frequency is a minimum; and j. verifying said mass balance configurations by creating a complete design embodying said selected mass balance configurations.

9. The method recited in claim 8, wherein said first and second DETFs are designed using classical formulae.

10. The method recited in claim 9, wherein said mass balances are formed on said first DETF symmetrically about a longitudinal axis thereof, and said mass balances are formed on second first DETF symmetrically about a longitudinal axis thereof.

* * * * *